(12) United States Patent
Zhou et al.

(10) Patent No.: US 9,887,862 B2
(45) Date of Patent: Feb. 6, 2018

(54) CIRCUITS AND METHODS FOR PERFORMING SELF-INTERFERENCE CANCELATION IN FULL-DUPLEX TRANSCEIVERS

(71) Applicants: Jin Zhou, Champaign, IL (US); Harish Krishnaswamy, New York, NY (US)

(72) Inventors: Jin Zhou, Champaign, IL (US); Harish Krishnaswamy, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 15/391,292

(22) Filed: Dec. 27, 2016

(65) Prior Publication Data

US 2017/0170999 A1    Jun. 15, 2017

Related U.S. Application Data

(63) Continuation-in-part of application No. PCT/US2016/065456, filed on Dec. 7, 2016.
(Continued)

(51) Int. Cl.
H04B 1/38        (2015.01)
H04L 25/08      (2006.01)
H04L 5/14        (2006.01)

(52) U.S. Cl.
CPC ............ H04L 25/08 (2013.01); H04L 5/1461 (2013.01)

(58) Field of Classification Search
CPC .... H04B 1/525; H04B 1/0053; H04B 1/0475; H04B 1/0003; H04B 1/715; H04B 1/48;
(Continued)

(56) References Cited

U.S. PATENT DOCUMENTS 3,304,519 A    2/1967  Weiss
4,061,905 A   12/1977  Fettweis
(Continued)

FOREIGN PATENT DOCUMENTS

WO    WO2014027231    2/2014
WO    WO 2017/139012   8/2017

OTHER PUBLICATIONS

Abdelhalem et al., "Tunable CMOS Integrated Duplexer with Antenna Impedance Tracking and High Isolation in the Transmit and Receive Bands", in IEEE Transactions on Microwave Theory and Techniques, vol. 62, issue 9, Sep. 2014, pp. 2092-2104.
(Continued)

Primary Examiner — Rahel Guarino
(74) Attorney, Agent, or Firm — Byrne Poh LLP

(57) ABSTRACT

Full duplex transceivers are provided, the transceivers comprising: a transmitter section that includes an analog portion having analog baseband signals and a digital portion having digital baseband signals; a receiver section that includes an analog portion having analog baseband signals and a digital portion having digital baseband signals; an analog self-interference canceller that, in response to the analog baseband signals in the analog portion of the transmitter section, produces analog cancellation signals that cancel first self-interference in the analog baseband signals in the analog portion of the receiver section; and a digital self-interference canceller that, in response to the digital baseband signals in the digital portion of the transmitter section, produces digital cancellation signals that cancel second self-interference in the digital baseband signals in the digital portion of the receiver section.

13 Claims, 3 Drawing Sheets

Related U.S. Application Data

(60) Provisional application No. 62/271,297, filed on Dec. 27, 2015, provisional application No. 62/346,977, filed on Jun. 7, 2016, provisional application No. 62/264,312, filed on Dec. 7, 2015, provisional application No. 62/271,297, filed on Dec. 27, 2015, provisional application No. 62/346,977, filed on Jun. 7, 2016.

(58) Field of Classification Search
CPC ... H04B 1/38; H04B 1/44; H04B 1/52; H04B 1/0057; H04B 17/12; H04L 5/14; H04L 25/03; H04L 27/34
USPC ........ 375/219; 370/278, 276, 282; 455/63.1, 455/296, 501, 83
See application file for complete search history.

(56) References Cited

U.S. PATENT DOCUMENTS

| | | | |
|---|---|---|---|
| 4,079,377 A | 3/1978 | Zur Heiden et al. | |
| 4,641,365 A | 2/1987 | Montini, Jr. | |
| 5,608,361 A | 4/1997 | Weiss et al. | |
| 6,141,571 A | 10/2000 | Dionne | |
| 7,778,611 B2* | 8/2010 | Asai ................. | H04B 1/525 455/78 |
| 7,817,641 B1 | 10/2010 | Khandani | |
| 8,155,602 B2 | 4/2012 | Ziaei et al. | |
| 8,576,752 B2 | 11/2013 | Sarca | |
| 8,829,973 B2 | 9/2014 | Sander | |
| 8,868,006 B2 | 10/2014 | Cox et al. | |
| 9,054,406 B2 | 6/2015 | Ueda et al. | |
| 9,197,170 B2 | 11/2015 | Corman et al. | |
| 9,203,455 B2 | 12/2015 | Yang et al. | |
| 9,319,210 B2 | 4/2016 | Choi et al. | |
| 9,325,432 B2 | 4/2016 | Hong et al. | |
| 9,337,885 B2 | 5/2016 | Mehlman et al. | |
| 2009/0247074 A1* | 10/2009 | Cox ................. | H04B 1/48 455/15 |
| 2010/0109791 A1 | 6/2010 | Lingel | |
| 2013/0241669 A1* | 9/2013 | Mikhemar ........... | H04B 1/52 333/126 |
| 2013/0343235 A1 | 12/2013 | Khan | |
| 2015/0016309 A1 | 1/2015 | Fang et al. | |
| 2015/0030280 A1 | 1/2015 | Alu et al. | |
| 2015/0055568 A1 | 2/2015 | Jindal et al. | |
| 2015/0188646 A1* | 7/2015 | Bharadia ............ | H04B 1/525 370/278 |
| 2015/0207537 A1 | 7/2015 | Cox et al. | |
| 2016/0087823 A1 | 3/2016 | Wang | |

OTHER PUBLICATIONS

Adam et al., "Ferrite Devices and Materials", in IEEE Transactions on Microwave Theory and Technology, vol. 50, issue 3, Mar. 2002, pp. 721-737.

Adam et al., "Monolithic Integration of an X-Band Circulator with GaAs MMICs", in the Proceedings of the IEEE International Microwave Symposium, Orlando, FL, US, May 16-20, 1995, pp. 97-98.

Andrews et al., "Implications of Passive Mixer Transparency for Impedance Matching and Noise Figure in Passive Mixer-First Receivers", in IEEE Transactions on Circuits and Systems, vol. 57, issue 12, Dec. 2010, pp. 3092-3103.

Aparin et al., "An Integrated LMS Adaptive Filter of TX Leakage for CDMA Receiver Front Ends", in IEEE Journal of Solid-State Circuits, vol. 41, No. 5, Apr. 2006, pp. 1171-1182.

Aryafar et al., "MIDU: Enabling MIMO Full Duplex", in Proceedings of the 18th Annual International Conference on Mobile Computing and Networking, Istanbul, TR, Aug. 2012, pp. 257-268.

Ayati et al., "Adaptive Integrated CMOS Circulator", in the Proceedings of the IEEE Radio Frequency Integrated Circuits Symposium, San Francisco, CA, US, May 22-24, 2016, pp. 146-149.

Bharadia et al., "Full Duplex Radios", in ACM SIGCOMM Computer Communication Review, vol. 43, No. 4, Oct. 2013, pp. 375-386.

Bi et al., "On-Chip Optical Isolation in Monolithically Integrated Non-Reciprocal Optical Resonators", in Nature Photonics, issue 5, Jun. 15, 2011, pp. 758-762.

Boers et al., "A 16TX/16RX 60 GHz 802.1 1AD Chipset with Single Coaxial Interface and Polarization Diversity", in IEEE Journal of Solid State Circuits, vol. 49, No. 12, Dec. 2014, pp. 3031-3045.

Busignies et al., "Some Relations Between Speed of Indication, Bandwidth, Signal-to-Random-Noise Ratio in Radio Navigation and Direction Finding", in the Proceedings of the IRE, vol. 37, No. 5, May 1949, pp. 478-488.

Carchon et al., "Power and Noise Limitations of Active Circulators", in IEEE Transaction on Microwave Theory and Techniques, vol. 48, issue 2, Feb. 2000, pp. 316-319.

Caster et al., "A 93-to-113 GHz BiCMOS 9-Element Imaging Array Receiver Utilizing Spatial-Overlapping Pixels with Wideband Phase and Amplitude Control", in the Proceedings of the IEEE Solid-State Circuits Conference, San Francisco, CA, US, Feb. 2013, 144-145.

Chakrabarti et al., "Design Considerations for Stacked Class-E-like mmWave Power DACs in CMOS", in the Proceedings of the IEEE International Microwave Symposium, Seattle, WA, US, Jun. 2013, pp. 1-4.

Chakrabarti et al., "High-Power, High-Efficiency, Class-E-like, Stacked mmWave PAs in SOI and Bulk CMOS: Theory and Implementation", in IEEE Transactions on Microwave Theory and Techniques, vol. 62, No. 8, Aug. 2014, pp. 1686-1704.

Chang et al., "Design and Analysis of 24-GHz Active Isolator and Quasi-Circulator", in IEEE Transactions on Microwave Theory and Techniques, vol. 63, No. 8, Aug. 2015, pp. 2638-2649.

Choi et al., "Achieving Single Channel, Full Duplex Wireless Communication", in the Proceedings of MobiCom, Chicago, IL, US, Sep. 2010, pp. 1-12.

Choi et al., "Full-Duplex Wireless Design", Stanford.edu, Nov. 2014, pp. 1-4, available at: http://sing.stanford.edu/fullduplex/.

Debaillie et al., "Analog/RF Solutions Enabling Compact Full-Duplex Radios", in IEEE Journal of Selected Areas of Communication, vol. 32, No. 9, Sep. 2014, pp. 1662-1673.

Dinc et al., "A 60GHz Same-Channel Full-Duplex CMOS Transceiver and Link Based on Reconfigurable Polarization-Based Antenna Cancellation", in the Proceedings of the IEEE Radio Frequency Integrated Circuits Symposium, Phoenix, AZ, US, May 2015, pp. 1-4.

Dinc et al., "A T/R Antenna Pair with Polarization-Based Reconfigurable Wideband Self-Interference Cancellation for Simultaneous Transmit and Receive", in the Proceedings of the IEEE International Microwave Symposium, Phoenix, AZ, US, May 2015, pp. 1-4.

Dinc et al., "CoSMIC 60 GHz Same-Channel Full-Duplex Transceiver Demo", YouTube, Mar. 2015, pp. 1-2, available at: https://youtube/9QA3euzT1HU.

Dinc et al., "CoSMIC 60 GHz Same-Channel Half-Duplex Transceiver Demo", YouTube, May 2015, pp. 1-2, available at: https://youtube/UMfkuqYNuyE.

Doerr et al., "Silicon Photonics Broadband Modulation-Based Isolator", in Optics Express, vol. 22, Feb. 20, 2014, pp. 4493-4498.

Duarte et al., "Full-Duplex Wireless Communications Using Off-the-Shelf Radios: Feasibility and First Results", in Conference Record of ASILOMAR, Nov. 2010, pp. 1558-1562.

Edwards et al., "High-Efficiency Elliptical-Slot Silicon RFIC Antenna with Quartz Superstrate", in the Proceedings of the Antennas and Propagation Society International Symposium, Chicago, IL, US, Jul. 2012, pp. 1-2.

Edwards et al., "High-Efficiency Silicon RFIC Millimeter-Wave Elliptical Slot-Antenna with a Quartz Lens", in the Proceedings of the IEEE International Symposium on Antennas and Propagation, Spokane, WA, US, Jul. 2011, pp. 899-902.

(56) References Cited

OTHER PUBLICATIONS

Elkholy et al., "Low-Loss Integrated Passive CMOS Electrical Balance Duplexers with Single-Ended LNA", in IEEE Transactions on Microwave Theory and Techniques, vol. 64, issue 5, May 2016, pp. 1544-1559.
Emami et al., "A 60 GHz CMOS Phase-array Transceiver Pair for Multi-Gb/s Wireless Communications", in the Proceedings of the IEEE International Solid-State Circuits Conference, San Francisco, CA, US, Feb. 2011, pp. 164-166.
Estep et al., "Magnetic-Free Non-Reciprocity and Isolation Based on Parametrically Modulated Coupled-Resonator Loops", in Nature Physics, vol. 10, Nov. 2014, pp. 923-927.
Estep et al., "Magnetless Microwave Circulators Based on Spatiotemporally Modulated Rings of Coupled Resonators", in IEEE Transactions on Microwave Theory and Techniques, vol. 64, No. 2, Feb. 2016, pp. 502-518.
Estep et al., "On-Chip Non-Reciprocal Components Based on Angular-Momentum Biasing", in the Proceedings of the IEEE International Microwave Symposium, Phoenix, AZ, US, May 2015, pp. 1-4.
Everett et al., "Passive Self-Interference Suppression for Full-Duplex Infrastructure Nodes", in IEEE Transactions on Wireless Communications, vol. 13, No. 2, Feb. 2013, pp. 680-694.
Fan et al., "An All-Silicon Passive Optical Diode", in Science, vol. 335, issue 6067, Jan. 2012, pp. 447-450.
Fleury et al., "Sound Isolation and Giant Linear Non-Reciprocity in a Compact Acoustic Circulator", in Science, vol. 343, issue 6170, Jan. 31, 2014, pp. 516-519.
Forbes et al., "Design and Analysis of Harmonic Rejection Mixers with Programmable LO Frequency", in IEEE Journal of Solid-State Circuits, vol. 48, issue 10, Oct. 2013, pp. 2363-2374.
Galland et al., "On-Chip Optical Non-Reciprocity Using Phase Modulators", in Optics Express, vol. 21, Jun. 2013, pp. 14500-14511.
Gallo et al, "All-Optical Diode in a Periodically Poled Lithium Niobate Waveguide", in Applied Physics Letters, vol. 79, No. 3, Jul. 16, 2001, pp. 314-316.
Ghaffari et al., "Tunable High-Q N-Path Band-Pass Filters: Modeling and Verification", in IEEE Journal of Solid-State Circuits, vol. 46, No. 5, Apr. 2011, pp. 998-1010.
Gharpurey, R., "Linearity Enhancement Techniques in Radio Receiver Front-Ends", in IEEE Transactions on Circuits and Systems, vol. 59, issue 8, Aug. 2012, pp. 1667-1679.
Goel et al., "Tunable Duplexer with Passive Feed-Forward Cancellation to Improve the RX-TX Isolation", in IEEE Transactions on Circuits and Systems, vol. 62, No. 2, Feb. 2015, pp. 536-544.
Gompa, N., "Full Duplex: A Fundamental Radio Tech Breakthrough That Could Double Throughput, Alleviate the Spectrum Crunch", ExtremeTech, Aug. 2014, pp. 1-9.
Guermandi et al., "A 79 GHz Binary Phase-Modulated Continuous-Wave Radar Transceiver with TX-to-RX Spillover Cancellation in 28 nm CMOS", in the Proceedings of the IEEE International Solid State Circuits Conference, San Francisco, CA, US, Feb. 2015, pp. 354-355.
Hong et al., "Applications of Self-Interference Cancellation in 5G and Beyond", in IEEE Communications Magazine, vol. 52, issue 2, Feb. 2014, pp. 114-121.
Jain et al., "A Single-Chip Dual-Band 22-20-Ghz/77-81-GHz BiCMOS Transceiver for Automotive Radars", in IEEE Journal of Solid-State Circuits, vol. 44, No. 12, Dec. 2009, pp. 3469-3485.
Jalas et al., "What Is—and What Is Not—an Optical Isolator", in Nature Photonics, issue 7, Jul. 30, 2013, pp. 579-582.
Kamal et al., "Noiseless Non-Reciprocity in a Parametric Active Device", in Nature Physics, vol. 7, Jan. 30, 2011, pp. 311-315.
Kang et al., "Reconfigurable Light-Driven Opto-Acoustic Isolators in Photonic Crystal Fibre", in Nature Photonics, vol. 5, Sep. 2011, pp. 549-553.
Khandani, A., "Two-way (true full-duplex) wireless," in Canadian Workshop on Information Theory (CWIT), Jun. 2013, pp. 33-38.
Khanikaev et al., "Topologically Robust Sound Propagation in an Angular-Momentum-Biased Graphene-Like Resonator Lattice", in Nature Communications, vol. 6, Oct. 2015, pp. 1-7.
Kim et al., "A Passive Circulator with High Isolation Using a Directional Coupler for RFID", in the Proceedings of the IEEE International Microwave Symposium, San Francisco, CA, US, Jun. 11-16, 2006, pp. 1177-1180.
Knox, M.E., "Single Antenna Full Duplex Communications using a Common Carrier", in the Proceedings of IEEE WAMICON, Apr. 2012, pp. 1-6.
Kodera et al., "Artificial Faraday Rotaion Using a Ring Metamaterial Structure Without Static Magnetic Field", in Applied Physics Letters, vol. 99, Jun. 2011, pp. 1-3.
Kodera et al., "Magnetless NonReciprocal Metamaterial Technology: Application to Microwave Components", in IEEE Transactions on Microwave Theory and Techniques, vol. 61, No. 3, Mar. 2013, pp. 1030-1042.
Kolodziej et al., "Ring Array Antenna with Optimized Beamformer for Simultaneous Transmit and Receive", in IEEE Antennas and Propagation Society International Symposium, Chicago, IL, US, Jul. 2012, pp. 1-2.
Kosugi et al., "MM-Wave Long-Range Wireless Systems", in IEEE Microwave Magazine, vol. 10, No. 2, Apr. 2009, pp. 68-76.
Laughlin et al., "Passive and Active Electrical Balance Duplexers", in IEEE Transactions on Circuits and Systems, vol. 63, issue 1, Sep. 25, 2015, pp. 94-98.
LePage et al., "Analysis of a Comb Filter Using Synchronously Commutated Capacitors", in Transactions of the American Institute of Electrical Engineers, vol. 72, issue 1, Mar. 1953, pp. 63-68.
Li et al., "A Fully Integrated 77 GHz FMCW Radar System in 65 nm CMOS", in the Proceedings of the IEEE International Solid-State Circuits Conference, San Francisco, CA, US, Feb. 2010, pp. 216-217.
Lira et al., "Broadband Hitless Silicon Electro-Optic Switch for On-Chip Optical Networks", in Optics Express, vol. 17, issue 25, pp. 22271-22280.
Lira et al., "Electrically Driven Nonreciprocity Induced by Interband Photonic Transition on a Silicon Chip", in Physical Review Letters, vol. 109, Jul. 20, 2012, pp. 1-5.
Mahmoud et al., "All-Passive Nonreciprocal Metastructure", in Nature Communications, vol. 6, Sep. 28, 2015, pp. 1-7.
Marasevic et al., "Resource Allocation and Rate Gains in Practical Full-Duplex Systems", in IEEE/ACM Transactions on Networking, vol. 25, issue 1, Feb. 2017, pp. 292-305.
Mikhemar et al., "A Multiband RF Antenna Duplexer on CMOS: Design and Performance", in the IEEE Journal of Solid-State Circuits, vol. 48, No. 9, Sep. 2013, pp. 2067-2077.
Mirzaei et al., "Reconfigurable RF Front-Ends for Cellular Receivers", in the Proceedings of the Compound Semiconductor Integrated Circuit Symposium, Monteray, CA, US, Oct. 3-6, 2010, pp. 1-4.
Moulder et al., "Wideband Antenna Array for Simutaneous Transmit and Receive (STAR) Applications", in IEEE Antennas and Propagation Society International Symposium, Memphis, TN, US, Jul. 2014, pp. 243-244.
Natarajan et al., "A Fully-Integrated 16-Element Phased-Array Receiver in SiGe BiCMOS for 60-GHz Communications", in IEEE Journal of Solid-State Circuits, vol. 46, No. 5, May 2011, pp. 1059-1075.
Natarajan et al., "W-Band Dual-Polarizatoin Phased-Array Transeiver Front-end in SiGe BiCMOS", in IEEE Transactions on Microwave Theory and Technology, vol. 63, No. 6, Jun. 2015, pp. 1989-2002.
Okada et al., "Full Four-Channel 6.3-Gb/s 60-GHz CMOS Transceiver with Low-Power Analog and Digital Baseband Circuitry", in IEEE Journal of Solid-State Circuits, vol. 48, No. 1, Jan. 2013, pp. 46-65.
Oliver et al., "A Monolithic Single-Crystal Yttrium Iron Garnet/ Silicon X-Band Circulator", in IEEE Microwave Guided Wave Letters, vol. 7, issue 8, Aug. 1997, pp. 239-241.
Peng et al., "Parity-Time-Symmetric Whispering-Gallery Microactivites", in Nature Physics, issue 10, Sep. 2013, pp. 394-398.

(56) References Cited

OTHER PUBLICATIONS

Qin et al., "Nonreciprocal Components with Distributedly Modulated Capacitors", in IEEE Transactions on Microwave Theory and Techniques, vol. 62, No. 10, Oct. 2014, pp. 2260-2272.
Razavi et al., "A 60-GHz CMOS Receiver Front End", in IEEE Journal of Solid-State Circuits, vol. 41, No. 1, Jan. 2006, pp. 17-22.
Reiskarimian et al., "Analysis and Design of Two-Port N-Path Bandpass Filters With Embedded Phase Shifting", in IEEE Transactions on Circuits and Systems, vol. 63, No. 8, Aug. 2016, pp. 1-5.
Reiskarimian et al., "Design of All-Passive High-Order CMOS N-path Filters", in the Proceedings of IEEE Radio Frequency Integrated Circuits Symposium (RFIC), Phoenix, AZ, US, May 17-19, 2015, pp. 83-86.
Reiskarimian et al., "Magnetic-Free Non-Reciprocity Based on Staggered Commutation", in Nature Communications, vol. 7, No. 4, Apr. 2016, pp. 1-10.
Sabharwal et al., In-Band Full-Duplex Wireless: Challenges and Opportunities, in IEEE Journal on Selected Areas in Communications, vol. 32, No. 9, Sep. 2014, pp. 1637-1652.
Sahai et al., "On the Impact of Phase Noise on Active Cancellation in Wireless Full-Duplex", in IEEE Transactions on Vehicular Technology, vol. 62, No. 9, Nov. 2013, pp. 4494-4510.
Saito et al., "A Fully Integrated 60-GHz CMOS Transceiver Chipset Based on WiGig/IEEE 802.11AD with Built-In Self Calibration for Mobile Usage", in IEEE Journal of Solid-State Circuits, vol. 48, No. 12, Dec. 2013, pp. 3146-3159.
Sarkas et al., "An 18-Gb/s, Direct QPSK Modulation SiGe BiCMOS Transceiver for Last Mile Links in the 70-80 GHz band", in IEEE Journal of Solid-State Circuits, vol. 45, No. 10, Oct. 2010, pp. 1968-1980.
Schelstraete et al., "An Introduction to 802.11ac", White Paper, Quantenna Communications, Sep. 2011, pp. 1-10.
Sengupta et al., "Silicon Integrated 280 GHz Imaging Chipset with 4×4 SiGe Receiver Array and CMOS Source", in IEEE Transactions on Terahertz Science and Technology, vol. 5, No. 3., May 2015, pp. 427-437.
Sharma et al., "216 and 316 GHz 45 nm SOI CMOS Signal Sources Based on a Maximum-Gain Ring Oscillator Topology", in IEEE Transactions on Microwave Theory and Techniques, vol. 61, No. 1, Jan. 2013, pp. 1-3.
Shoji et al., "Magneto-Optical Isolator with Silicon Waveguides Fabricated by Direct Bonding", in Applied Physics Letter, vol. 92, issue 7, Jan. 2008, pp.
Skyworks Solutions Inc., "SKYFR-000709: 2110-2170 MHz Single Junction Robust Lead Circulator", Technical Paper, May 7, 2013, pp. 1-4.
Snow et al., "Transmit-Receive Duplexing Using Digital Beamforming System to Cancel Self-Interference", in IEEE Transactions on Microwave Theory and Techniques, vol. 59, No. 12, Dec. 2011, pp. 3494-3503.
Soer et al., "Unified Frequency-Domain Analysis of Switched-Series-Passive Mixers and Samplers", in IEEE Transactions on Circuits and Systems, vol. 57, No. 10, Oct. 2010, pp. 2618-2631.
Soljacic et al, "Nonlinear Photonic Crystal Microdevices for Optical Integration", in Optics Letters, vol. 28, No. 8, Apr. 15, 2003, pp. 637-639.
Sounas et al., "Giant Reciprocity at the Subwavelength Scale Using Angular Momentum-Biased Metamaterials", in Nature Communications, vol. 4, Sep. 2013, pp. 1-7.
Tabesh et al. "A 65NM CMOS 4-Element Sub-34 mW/Element 60GHz Phased Array Tranceiver", in IEEE Journal of Solid-State Circuits, vol. 46, No. 12, Dec. 2011, pp. 3018-3032.
Tanaka et al., "The Realization of Circulators Using Transistors", in the Proceedings of the IEEE, vol. 53, issue 3, Mar. 1965, pp. 260-267.
Tang et al., "Balanced RF-Circuit Based Self-Interference Cancellation for Full Duplex Communications", in Ad Hoc Networks, vol. 24, Jan. 2015, pp. 214-227.
Thomas et al., "Brodband Synthetic Transmission-Line N-Path Filter Design", in IEEE Transactions on Microwave Theory and Techniques, vol. 63, issue 10, Oct. 2015, pp. 3525-3536.
Tomkins et al., "A Zero-IF 60 GHz 65 nm CMOS Transceiver with Direct BPSK Modulation Demonstrating up to 6 gb/s Data Rates over a 2 m Wireless Link", in IEEE Journal of Solid-State Circuits, vol. 44, No. 8, Aug. 2009, pp. 2085-2099.
Tyagi et al., "An Advanced Low Power High Performance, Strained Channel 65nm Technology", in the Proceedings of the IEEE International Electron Devices Meetings, Washington, DC, US, Dec. 2005, pp. 1-4.
Van den Broek et al., "A Self-Interference Cancelling Front-End for In-Band Full-Duplex Wireless and its Phase Noise Performance", in the Proceedings of the IEEE Radio Frequency Integrated Circuits Symposium, Phoenix, AZ, US, May 2015, pp. 75-78.
Van den Broek et al., "A Self-Interference Cancelling Receiver for In-Band Full-Duplex Wireless with Low Distortion under Cancellation of Strong TX Leakage", in Proceedings of the IEEE Solid-Slate Circuits Conference, San Francisco, CA, US, Feb. 2015, pp. 1-8.
Van Den Broek et al., "An In-Band Full-Duplex Radio Receiver with Passive Vector Modulator Downmixer for Self-Interference Cancellation", in IEEE Journal of Solid State Circuits, vol. 50, No. 12, Dec. 2015, pp. 3003-3014.
Van Liempd et al., "An Electrical-Balance Duplexer for In-Band Full-Duplex with <− 85dBm In-Band Distortion at + 10dBm TX-Power", in the Proceedings of the European Solid-State Circuits Conference, Graz, AT, Sep. 14-18, 2015, pp. 1-5.
Vidojkovic et al., "A Low-Power Radio Chipset in 40 nm LP CMOS with Beamforming for 60 GHz High-Data-Rate Wireless Communication", in the Proceedings of the IEEE International Solid-State Circuits Conference, San Francisco, CA, US, Feb. 2013, pp. 236-237.
Vlasov et al., "High-Throughput Silicon Nanophotonic Wavelength-Insensitive Switch for On-Chip Optical Networks", in Nature Photonics, vol. 2, Mar. 2008, pp. 242-246.
Wang et al., "Fully Integrated 10-GHz Active Circulator and Quasi-Circulator Using Bridged-T Networks in Standard CMOS", in IEEE Transactions on Very Larg Scale Integration Systems, vol. 24, issue 10, Mar. 15, 2016, pp. 3184-3192.
Wang et al., "Gyrotropic Response in the Absence of a Bias Field", in the Proceedings of the National Academy of Sciences, vol. 109, No. 33, May 17, 2012, pp. 13194-13197.
Wegener et al., "Broadband Near-Field Filters for Simultaneous Transmit and Receive in a Small Two-Dimensional Array", in the Proceedings of the IEEE International Microwave Symposium, Tampa Bay, FL, US, Jun. 2014, pp. 1-3.
Wegener et al., "High Isolation in Antenna Arrays for Simultaneous Transmit and Receive", in the Proceedings of the IEEE International Symposium on Phased Array Systems and Technology, Waltham, MA, US, Oct. 2013, pp. 593-597.
Wegener et al., "Simultaneous Transmit and Receive with a Small Planar Array", in the Proceedings of the International Microwave Symposium, Montreal, QC, CA, Jun. 2012, pp. 1-3.
Wells, J., "Faster Than Fiber: The Future of Mulli-G/s Wireless", in IEEE Microwave Magazine, vol. 10, No. 3, May 2009, pp. 104-112.
Yang et al., "A Wideband Highly Integrated and Widely Tunable Transceiver for In-Band Full-Duplex Communication", in IEEE Journal of Solid State Circuits, vol. 50, No. 5, May 2015, pp. 1189-1202.
Yang et al., "A Widely Tunable Active Duplexing Transceiver with Same-Channel Concurrent RX/TX and 30db RX/TX Isolation", in the Proceedings of the IEEE Radio Frequency Integrated Circuits Symposium, Tampa, FL, US, Jun. 2014, pp. 321-324.
Yao et al., "65 GHz Doppler Sensor with On-Chip Atenna in 0.18um SiGe BiCOMS", in the Proceedings of the IEEE International Microwave Symposium, San Francisco, CA, US, Jun. 2006, pp. 1493-1496.
Yetisir et al., "Low-Profile UWB 2-Port Antenna with High Isolation", in IEEE Antennas Wireless Propagation Letters, vol. 13, Jan. 2014, pp. 55-58.

(56) References Cited

OTHER PUBLICATIONS

Yin, B. et al., "Full-Duplex in Large-Scale Wireless Systems", In Proceedings of the Asilomar Conference no Siganls, Systems, and Computers, Nov. 2013, pp. 1623-1627.

Yu et al., "Complete Optical Isolation Created by Indirect Interband Photonic Transitions", in Nature Photonics, vol. 3, Jan. 11, 2009, pp. 91-94.

Yuksel et al., "A Circuit-Level Model for Accurately Modeling 3rd Order Nonlinearity in CMOS Passive Mixers", in the Proceedings of the IEEE Radio Frequency Integrated Circuits Symposium, Tampa, FL, US, Jun. 1-3, 2014, pp. 127-130.

Zander et al., "Riding the Data Tsunami in the Cloud: Myths and Challenges in Future Wireless Access", in IEEE Communications Magazine, vol. 51, No. 3, Mar. 2013, pp. 145-151.

Zanjani et al., "One-Way Phonon Isolation in Acoustic Waveguides", in Applied Physics Letters, vol. 104, Feb. 2014, pp. 1-5.

Zhang et al., "An Integrated CMOS Passive Self-Interference Mitigation Technique for FDD Radios", in IEEE Journal of Solid-State Circuits, vol. 50, No. 5, May 2015, pp. 1176-1188.

Zhang et al., "On-Chip Antennas for 60-GHz Radios in Silicon Technology", in IEEE Transactions on Electron Devices, vol. 52, No. 7, Jul. 2005, pp. 1664-1668.

Zhou et al., "Integrated Wideband Self-Interference Cancellation in the RF Domain for FDD and Full-Duplex Wireless", in IEEE Journal of Solid-State Circuits, vol. 50, No. 12, Dec. 2015, pp. 3015-3031.

Zhou et al., "Low-Noise Active Cancellation of Transmitter Leakage and Transmitter Noise in Broadband Wireless Receivers for FDD/Co-Existence", in IEEE Journal of Solid-State Circuits, vol. 49, No. 12, Dec. 2014, pp. 3046-3062.

Zhou et al., "Receiver with Integrated Magnetic-Free N-Path-Filter-Based Non-Reciprocal Circulator and Baseband Self-Interference Cancellation for Full-Duplex Wireless", in the Proceedings of the IEEE International Solid-State Circuits Conference, San Francisco, CA, US, Jan. 31-Feb. 4, 2016, pp. 178-180.

Zhou et al., "Reconfigurable Receiver with >20MHz Bandwidth Self-Interference Cancellation Suitable for FDD, Co-Existence and Full-Duplex Applications", in the Proceedings of the IEEE Solid-State Circuits Conference, San Francisco, CA, US, Feb. 2015, pp. 1-3.

Zhu et al., "Demystifying 60GHz Outdoor Picocells", in the Proceedings of the 20th Annual International Conference on Mobile Computing and Networking, Maui, HI, US, Sep. 2014, pp. 5-16.

International Search Report and Written Opinion dated Aug. 14, 2017 in International Patent Application No. PCT/US2016/065456.

* cited by examiner

CIRCUITS AND METHODS FOR PERFORMING SELF-INTERFERENCE CANCELATION IN FULL-DUPLEX TRANSCEIVERS

CROSS-REFERENCE TO RELATED APPLICATIONS

This application claims the benefit of U.S. Provisional Patent Application No. 62/271,297, filed Dec. 27, 2015, and U.S. Provisional Patent Application No. 62/346,977, filed Jun. 7, 2016, and is a continuation-in-part of International Patent Application No. PCT/US2016/065456, filed Dec. 7, 2016, which claims the benefit of U.S. Provisional Patent Application No. 62/264,312, filed Dec. 7, 2015, U.S. Provisional Patent Application No. 62/271,297, filed Dec. 27, 2015, and U.S. Provisional Patent Application No. 62/346,977, filed Jun. 7, 2016. Each of the applications listed in the foregoing sentence is hereby incorporated by reference herein in its entirety.

STATEMENT REGARDING GOVERNMENT FUNDED RESEARCH

This invention was made with government support under contracts FA8650-14-1-7414 and HR0011-12-1-0006 awarded by the Defense Advanced Research Projects Agency. The government has certain rights in the invention.

BACKGROUND

Full-duplex communications, in which a transmitter and a receiver of a transceiver operate simultaneously on the same frequency band, is drawing significant interest for emerging 5G communication networks due to its potential to double network capacity compared to half-duplex communications.

However, one of the biggest challenges in implementing full-duplex communications is managing self-interference. Self-interference is interference present in a receiver channel of a transceiver that is caused by signals transmitted from a transmitter channel of the transceiver.

Accordingly, new mechanisms for implementing self-interference cancellation in full-duplex transceivers are desirable.

SUMMARY

In accordance with some embodiments, full duplex transceivers are provided, the transceivers comprising: a transmitter section that includes an analog portion having analog baseband signals and a digital portion having digital baseband signals; a receiver section that includes an analog portion having analog baseband signals and a digital portion having digital baseband signals; an analog self-interference canceller that, in response to the analog baseband signals in the analog portion of the transmitter section, produces analog cancellation signals that cancel first self-interference in the analog baseband signals in the analog portion of the receiver section; and a digital self-interference canceller that, in response to the digital baseband signals in the digital portion of the transmitter section, produces digital cancellation signals that cancel second self-interference in the digital baseband signals in the digital portion of the receiver section.

DETAILED DESCRIPTION

In accordance with some embodiments, mechanisms for providing self-interference cancellation in a full duplex transceiver in accordance with some embodiments are provided. In some embodiments, digital self-interferences can be provided using a non-linear tapped delay line.

Figure 1:
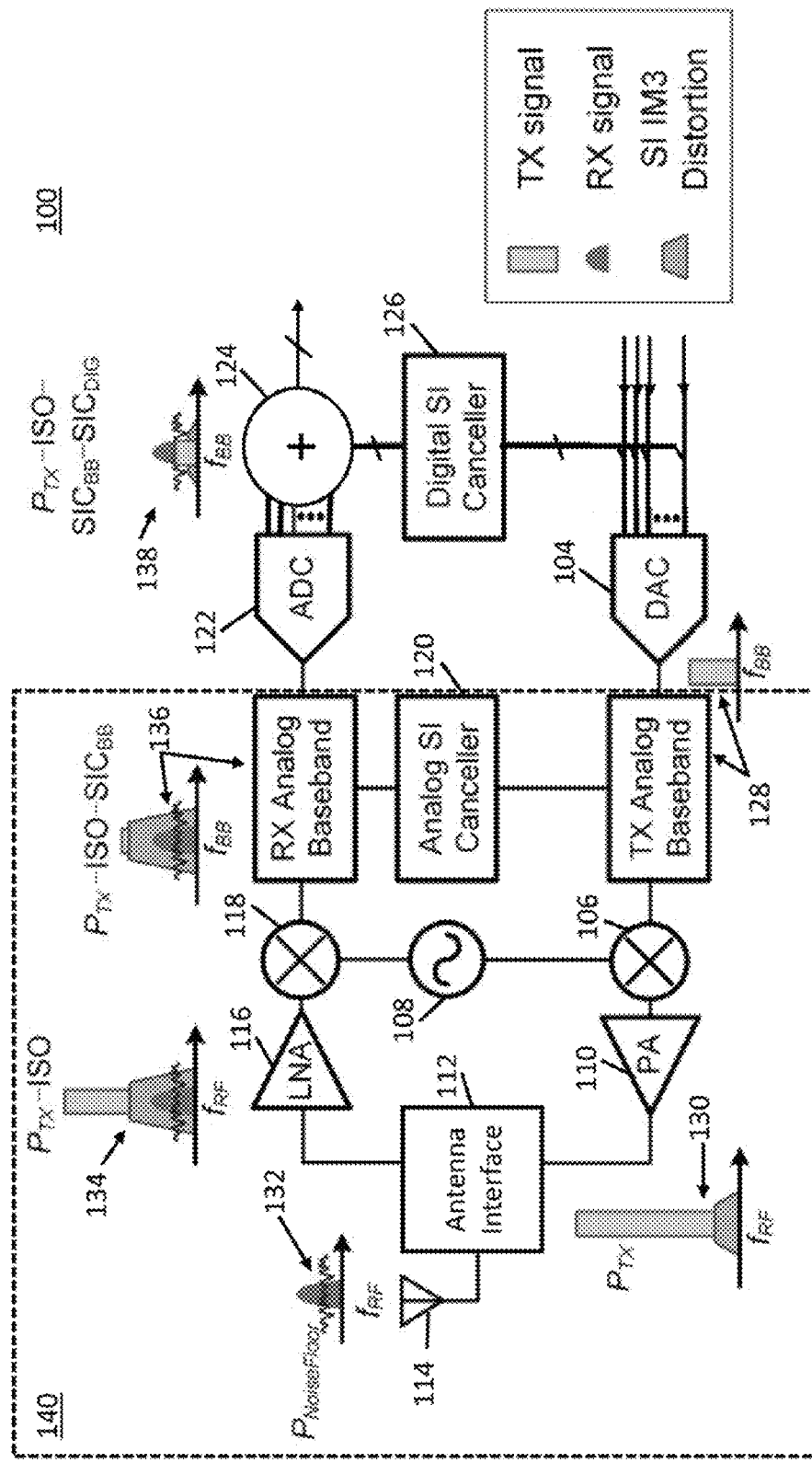
FIG. 1 is a block diagram of an example of a full duplex transceiver incorporating an analog self-interference canceller and a digital self-interference canceller in accordance with some embodiments.

Turning to FIG. 1, an example 100 of a block diagram of a full duplex transceiver incorporating self-interference cancellation mechanisms in accordance with some embodiments is shown. As illustrated, transceiver 100 includes a digital-to-analog converter (DAC) 104, a mixer 106, a local oscillator generator 108, a power amplifier (PA) 110, an antenna interface 112, an antenna 114, a low-noise amplifier (LNA) 116, a mixer 118, an analog self-interference (SI) canceller 120, an analog-to-digital converter (ADC) 122, an adder 124, and a digital self-interference (SI) canceller 126.

During operation of transceiver 100, DAC 104 converts a signal to be transmitted from digital form to analog form resulting in a transmitter (TX) analog baseband signal 128. The transmitter analog baseband signal is then upconverted by mixer 106 using a local oscillator from local oscillator generator 108. The upconverted signal is then amplified by power amplifier (PA) 110. The signal output by PA 110 is represented in FIG. 1 by signal 130, which includes a $P_{TX}$ component, which is an amplified form of the transmitter signal, and a self-interference (SI) third-order inter-modulation (IM3) distortion component. The signal output by PA 110 is provided to antenna interface 112, which directs the signal to antenna 114 for transmission. A signal received at antenna 114 is represented in FIG. 1 by signal 132, which includes a desired signal component and a noise component. The signal received at the antenna is directed by antenna interface 112 to the input of low noise amplifier 116, which amplifies the received signal. As illustrated by signals 134, the signals received at the antenna are combined with interference from the signal output by PA 110 that is not isolated by antenna interface 112. Mixer 118 then downconverts the amplified signal using a local oscillator from generator 108. Based on transmitter analog baseband signal 128, analog self-interference canceller 120 provides a signal that cancels at least some of the self-interference in the output of mixer 118. The combined output of mixer 118 and canceller 120 is represented by receiver (RX) analog baseband signals 136. The RX analog baseband signal is then converted to digital form by ADC 122 and provided to adder 124. Digital SI canceller 126, based on signals at the input to DAC 104, provides digital cancellation signals to adder 124 that, when added to the output of ADC 122, further cancels the self-interference from the $P_{TX}$ signal and the SI IM3 distortion. The is represented by signals 138.

DAC 104 and ADC 122 can be implemented in any suitable manner using any suitable digital-to-analog and analog-to-digital converters.

In some embodiments, analog self-interference canceller 120 can be implemented as described below in connection with analog baseband self-interference canceller 228 of FIG. 2.

Mixers 106 and 118 can be implemented in any suitable manner using any suitable mixers in some embodiments.

Generator 108 can be implemented in any suitable manner using any suitable local oscillator generator in some embodiments.

Power amplifier 110 can be implemented in any suitable manner using any suitable power amplifier in some embodiments.

LNA 116 can be implemented in any suitable manner using any suitable low noise amplifier in some embodiments.

Adder 124 can be implemented in any suitable manner using any suitable adder in some embodiments.

Antenna 114 can be implemented in any suitable manner using any suitable antenna in some embodiments.

Antenna interface 112 can be implemented in any suitable manner using any suitable antenna interface, such as non-reciprocal circulator or an electrical balance duplexer, in some embodiments.

In some embodiments, rather than using antenna interface 112 and a single antenna 114, two antennas 114 can be used, one connected to the output of power amplifier 110 and the other connected to the input of LNA 116, and antenna interface 112 can be omitted.

Figure 2:
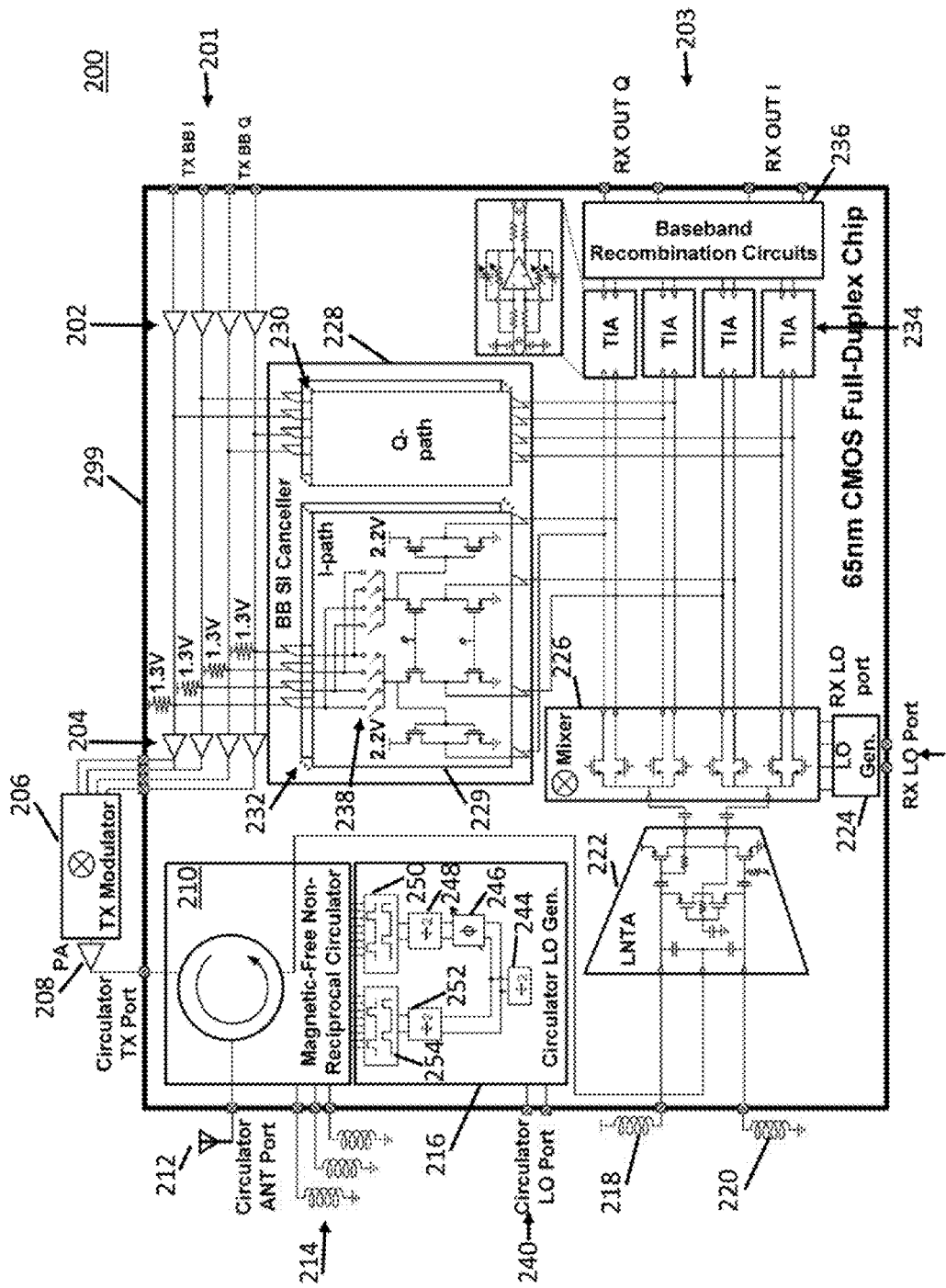
FIG. 2 is a schematic of an example of a portion a full duplex transceiver that can be used as a portion of the full duplex transceiver of FIG. 1 in accordance with some embodiments.

Turning to FIG. 2, a more detailed example 200 of portion 140 of transceiver 100 in accordance with some embodiments is shown. Box 299 represents a chip on which the encompassed components can be implemented in some embodiments. In some embodiments, such a chip can be implemented in 65 nm CMOS technology.

As illustrated, transceiver portion 200 is implemented using transmit baseband buffers 202 and 204, a transmit modulator 206, a power amplifier 208, a non-reciprocal circulator 210 (of which inductors 214 are a part), an antenna 212, a circulator local oscillator (LO) generator 216, inductors 218 and 220, a common-gate, common-source low-noise transconductance amplifier (LNTA) 222, a receiver (RX) LO generator 224, a four-phase passive mixer 226, an analog baseband (BB) self-interference canceller (SIC) 228, transimpedance amplifiers (TIAs) 234, and analog baseband recombination circuitry 236.

Transmit baseband buffers 202 and 204 can be implemented in any suitable manner using any suitable baseband buffers in some embodiments.

Transmit modulator 206 can be implemented in any suitable manner using any suitable modulator in some embodiments. For example, in some embodiments, modulator 206 can be implemented using part number TRF370417 available from Texas Instruments (of Dallas, Tex.).

Power amplifier 208 can be implemented in any suitable manner using any suitable power amplifier in some embodiments.

Non-reciprocal circulator 210 can be implemented in any suitable manner using any suitable non-reciprocal circulator in some embodiments. For example, in some embodiments, non-reciprocal circulator can be implemented using non-reciprocal circulator as described in connection with FIG. 4 of International Patent Application No. PCT/US2016/065456, filed Dec. 7, 2016, which is hereby incorporated by reference herein in its entirety.

Antenna 212 can be implemented in any suitable manner using any suitable antenna in some embodiments.

Inductors 218 and 220 can be implemented in any suitable manner using any suitable inductors for use with LNTA 222 in some embodiments.

Common-gate, common-source low-noise transconductance amplifier (LNTA) 222 can be implemented in any suitable manner using any suitable LNTA in some embodiments. For example, in some embodiments, LNTA 222 can be implemented as shown in the schematic of FIG. 2.

Four-phase passive mixer 226 can be any suitable four-phase passive mixer in some embodiments. For example, in some embodiments, mixer 226 can be implemented as shown in the schematic of FIG. 2.

Transimpedance amplifiers (TIAs) 234 can be implemented in any suitable manner using any suitable TIAs in some embodiments. For example, in some embodiments, TIAs 234 can be implemented as shown in the schematic of FIG. 2.

Analog baseband recombination circuitry 236 can be implemented in any suitable manner using any suitable analog baseband recombination circuitry in some embodiments. For example, recombination circuitry 236 can be implemented using voltage to current converting $g_m$ cells as shown in circuitry 734 of FIG. 7 of International Patent Application No. PCT/US2016/065456, filed Dec. 7, 2016, which is hereby incorporated by reference herein in its entirety. The recombination circuit may be formed from multiple pairs of $g_m$s to form I/Q outputs of the receiver.

During operation, transmit signals received at baseband I and Q inputs 201 are amplified by buffers 202 and 204, modulated by modulator 206, amplified by amplifier 208, directed to antenna 212 by circulator 210, and transmitted by antenna 212. Signals received at antenna 212 are directed by circulator 210 to LNTA 222, amplified by LNTA 222, down-converted by mixer 226, amplified by TIAs 234, converted to I and Q baseband outputs by circuitry 236, and output at outputs 203. Analog BB SIC 228 taps from the transmit baseband signals between the baseband buffers 202 and 204, adjusts the amplitude and the phase of the tapped signals, and injects cancellation currents at the inputs to TIA 234.

Amplitude and phase scaling in analog BB SIC 228 is achieved through two five-bit digitally-controlled phase rotators 230 and 232 injecting into the I-paths and the Q-paths of the RX analog BB, respectively. Each phase rotator can include 31 (or any other suitable number) identical cells with independent controls 238 (these controls can determine the contribution of each cell to the analog BB SIC current). Each cell, which can be implemented in any suitable manner in some embodiments (e.g., such as shown in box 229), of the phase rotator adopts a noise-canceling common-gate (CG) and common-source (CS) topology, allowing partial cancellation of the noise from the CG devices (dependent on the phase rotator setting at controls 238).

Circulator 210 can be implemented in any suitable manner in some embodiments, such as described in connection with FIGS. 4 and 6 of International Patent Application No. PCT/US2016/065456, filed Dec. 7, 2016, which is hereby incorporated by reference herein in its entirety.

Circulator 210 receives from circulator LO generator 216 two sets of eight non-overlapping clock signals each with 12.5% duty cycle. These clock signals are used to control the switches in the eight paths of the N-path filter of circulator 210.

Generator 216 can be implemented in any suitable manner in some embodiments. For example, in some embodiments, to generate these clock signals, generator 216 receives two differential (0 degree and 180 degree) input clocks that run at four times the desired commutation frequency. A divide-by-two frequency-divider circuit 244 generates four quadrature clocks with 0 degree, 90 degree, 180 degree, and 270 degree phase relationship. These four clock signals drive two parallel paths for the two sets of switches.

In a first of the two paths, a programmable phase shifter 246 that allows for arbitrary staggering between the two commutating switch sets is provided. Programmable phase shifter 246 enables switching between −90 degree and +90 degree staggering, which allows dynamic reconfiguration of the circulation direction. The phase shifter also allows for fine tuning of the staggered phase shift to optimize the transmission loss in the circulation direction and isolation in the reverse direction. After phase shifting, another divide-by-two circuit 248 and a non-overlapping 12.5% duty-cycle clock generation circuit 250 create the clock signals that control the commutating transistor switches in the first path.

In a second of the two paths, directly after first divide-by-two frequency-divider circuit 244, another divide-by-two circuit 252 and a non-overlapping 12.5% duty-cycle clock generation circuit 254 create the clock signals that control the commutating transistor switches in the second path.

Divide-by-two circuits 244, 248, and 252, phase shifter 246, and non-overlapping 12.5% duty-cycle clock generation circuits 250 and 254 can be implemented in any suitable manner.

In some embodiments, circulator LO generator 216 may use static 90 degree phase-shifts or digital phase interpolators that preserve the square-wave nature of the clock.

At RX LO port 242, RX LO generator 224 receives two differential (0 degree and 180 degree) input clocks that run at two times the operating frequency of the receiver (e.g., 750 MHz). A divide-by-two frequency-divider circuit (which can be implemented in any suitable manner) in generator 224 generates four quadrature clocks with 0 degree, 90 degree, 180 degree, and 270 degree phase relationship.

In some embodiments, although not shown, an impedance tuner can be provided to counter reflections due to antenna impedance mismatch. The tuner can be used at the ANT port for joint optimization of SIC bandwidth (BW) between the circulator and the analog BB canceller.

In some embodiments, transceivers take advantage of inherent down-conversion of an N-path filter to merge a circulator and a receiver.

Figure 3:
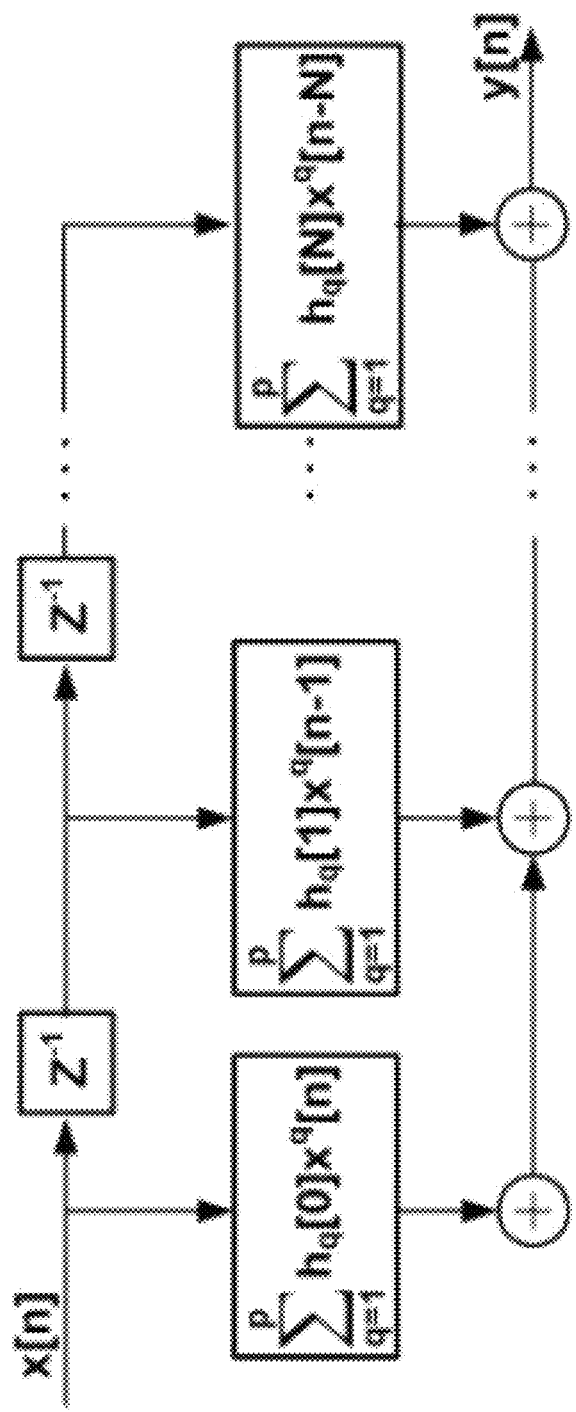
FIG. 3 is an illustration of a non-linear tapped delay line that can be used to implement digital self-interference cancellation in a full duplex transceiver in accordance with some embodiments.

Turning back to FIG. 1, in accordance with some embodiments, digital self-interference canceller 126 can be implemented using a non-linear tapped delay line. In some embodiments, a non-linear tapped delay line can be implemented in any suitable hardware processor (such as a digital signal processor, microprocessor, etc.) that is programmed to perform a non-linear tapped delay line function. For example, in accordance with some embodiments, such a non-linear tapped delay line can be implemented as illustrated in FIG. 3, which essentially models the self-interference channel in digital as a truncated Volterra series:

$$y[n] = \sum_{k=0}^{N} h_1[k]x[n-k] + \sum_{k=0}^{N} h_2[k]x^2[n-k] +$$

-continued
$$\sum_{k=0}^{N} h_3[k]x^3[n-k] + \ldots + \sum_{k=0}^{N} h_p[k]x^p[n-k]$$

where y[n] is the digital SI canceller output, x[n] and x[n−k] (k represents the delay index) are the current and past TX digital baseband signals, N corresponds to the maximum delay in the modeled SI channel, and $h_i[k]$ (i=1, 2, 3, ..., p) is the i-th order digital canceller coefficient for delay index of k.

In some embodiments, truncating the Volterra series can be used to reduce the digital SI canceller complexity to a manageable level. For example, in some embodiments, non-linear terms up to 4th order (i.e., p=4) can be considered with a delay spread length of 41 samples (i.e., N=40), resulting in 164 total unknown canceller coefficients.

In some embodiments, the digital SI canceller coefficients can be determined using a two-tone pilot signal. More particularly, given an M-length pilot sequence Y (y[0], y[1], ..., y[M−1]) and a N-length nonlinear coefficient sequence H ($h_1[0]$, $h_1[1]$, ...), and taking noise into account, we have the following linear equation:

$$Y = XH + n$$

where X is a M*N matrix that consists of TX digital baseband signals (x[0], x[1], $x^2[0]$, $x^3[0]$, ...), and n is the noise from the SI channel. The goal is to find a $\hat{H}$ that minimizes $|X\hat{H} - Y|$. When the received data points are more than the number of unknown coefficients (M>N), this becomes a least-squares problem, and $\hat{H}$ can be found as:

$$\hat{H} = A^+ Y$$

where $A^+$ is the pseudo-inverse of matrix A.

Although the disclosed subject matter has been described and illustrated in the foregoing illustrative implementations, it is understood that the present disclosure has been made only by way of example, and that numerous changes in the details of implementation of the disclosed subject matter can be made without departing from the spirit and scope of the disclosed subject matter, which is limited only be the claims that follow. Features of the disclosed implementations can be combined and rearranged in various ways.

What is claimed is:

1. A full duplex transceiver comprising:
   a transmitter section that includes an analog portion having analog baseband signals and a digital portion having digital baseband signals;
   a receiver section that includes an analog portion having analog baseband signals and a digital portion having digital baseband signals;
   an analog self-interference canceller that, in response to the analog baseband signals in the analog portion of the transmitter section, produces analog cancellation signals that cancel first self-interference in the analog baseband signals in the analog portion of the receiver section; and
   a digital self-interference canceller that, in response to the digital baseband signals in the digital portion of the transmitter section, produces digital cancellation signals that cancel second self-interference in the digital baseband signals in the digital portion of the receiver section, wherein the digital self-interference canceller performs a non-linear tapped delay line function on the digital baseband signals in the digital portion of the transmitter section to produce the digital cancellation signals.

2. The full duplex transceiver of claim 1, wherein the transmitter section comprises a digital-to-analog converter that separates the digital portion of the transmitter section from the analog portion of the transmitter section.

3. The full duplex transceiver of claim 1, wherein the receiver section comprises an analog-to-digital converter that separates the analog portion of the receiver section from the digital portion of the receiver section.

4. The full duplex transceiver of claim 1, wherein the non-linear tapped delay line function is:

$$y[n] = \sum_{k=0}^{N} h_1[k]x[n-k] + \sum_{k=0}^{N} h_2[k]x^2[n-k] + \sum_{k=0}^{N} h_3[k]x^3[n-k] + \ldots + \sum_{k=0}^{N} h_p[k]x^p[n-k]$$

where y[n] is an output of the delay line, k is a delay index, x[n−k] is current and past values of the digital baseband signals of the transmitter section, N corresponds to a maximum delay, and $h_i[k]$ (i=1, 2, 3, . . . , p) is an i-th order digital canceller coefficient for delay index of k.

5. A full duplex transceiver comprising:
a transmitter section that includes an analog portion having analog baseband signals and a digital portion having digital baseband signals;
a receiver section that includes an analog portion having analog baseband signals and a digital portion having digital baseband signals;
an analog self-interference canceller that, in response to the analog baseband signals in the analog portion of the transmitter section, produces analog cancellation signals that cancel first self-interference in the analog baseband signals in the analog portion of the receiver section, wherein the analog self-interference canceller performs amplitude and phase scaling on the analog baseband signals in the analog portion of the transmitter section to produces analog cancellation signals; and
a digital self-interference canceller that, in response to the digital baseband signals in the digital portion of the transmitter section, produces digital cancellation signals that cancel second self-interference in the digital baseband signals in the digital portion of the receiver section.

6. The full duplex transceiver of claim 1, where an output of the transmitter section and an input of the receiver section are connected to an antenna interface that is also connected to an antenna that transmits signals from the transmitter section and receives signals provided to the receiver section.

7. The full duplex transceiver of claim 6, wherein the antenna interface is a non-reciprocal circulator.

8. The full duplex transceiver of claim 6, wherein the antenna interface is an electrical balance duplexer.

9. The full duplex transceiver of claim 5, wherein the transmitter section comprises a digital-to-analog converter that separates the digital portion of the transmitter section from the analog portion of the transmitter section.

10. The full duplex transceiver of claim 5, wherein the receiver section comprises an analog-to-digital converter that separates the analog portion of the receiver section from the digital portion of the receiver section.

11. The full duplex transceiver of claim 5, where an output of the transmitter section and an input of the receiver section are connected to an antenna interface that is also connected to an antenna that transmits signals from the transmitter section and receives signals provided to the receiver section.

12. The full duplex transceiver of claim 11, wherein the antenna interface is a non-reciprocal circulator.

13. The full duplex transceiver of claim 11, wherein the antenna interface is an electrical balance duplexer.

\* \* \* \* \*